US012761009B2

(12) United States Patent
Makino et al.

(10) Patent No.: US 12,761,009 B2
(45) Date of Patent: Oct. 13, 2026

(54) MEASURING DEVICE AND METHOD FOR MEASURING WORKPIECE USING THE MEASURING DEVICE

(71) Applicant: MITUTOYO CORPORATION, Kawasaki (JP)

(72) Inventors: Takumi Makino, Gifu (JP); Mao Kikuchi, Gifu (JP); Tomoharu Kurata, Gifu (JP)

(73) Assignee: MITUTOYO CORPORATION, Kawasaki (JP)

( * ) Notice: Subject to any disclaimer, the term of this patent is extended or adjusted under 35 U.S.C. 154(b) by 363 days.

(21) Appl. No.: 18/498,417

(22) Filed: Oct. 31, 2023

(65) Prior Publication Data

US 2024/0142214 A1 May 2, 2024

(30) Foreign Application Priority Data

Nov. 1, 2022 (JP) ................................. 2022-175835

(51) Int. Cl.
*G01B 5/28* (2006.01)
*G01B 5/20* (2006.01)

(52) U.S. Cl.
CPC ............... *G01B 5/28* (2013.01); *G01B 5/201* (2013.01)

(58) Field of Classification Search
CPC .......... G01B 3/22; G01B 5/012; G01B 5/016; G01B 5/201; G01B 5/28; G01B 7/012; G01B 5/20; G01B 5/004; G01B 3/20; G01B 3/205; G01B 5/00; G01B 5/10; G01B 5/213; F16C 29/04; B23B 25/06; G05B 2219/37008; G05B 2219/37619; G05B 2219/45136; G05B 2219/50152
USPC .... 33/551, 556, 626, 642, 644, 645; 73/105; 82/1.11, 117, 151, 170
See application file for complete search history.

(56) References Cited

U.S. PATENT DOCUMENTS 1,431,614 A * 10/1922 Wittner .................... G01B 3/22 33/559
4,389,784 A * 6/1983 Zanier ...................... G01B 5/00 33/DIG. 6

(Continued)

FOREIGN PATENT DOCUMENTS

DE 112023000315 T5 * 9/2024 ............... G01B 5/00
EP 1762816 A1 * 3/2007 ............... G01B 3/22

(Continued)

*Primary Examiner* — Peter J Macchiarolo
(74) *Attorney, Agent, or Firm* — Oblon, McClelland, Maier & Neustadt, L.L.P.

(57) ABSTRACT

There is provided a measuring device that is inexpensive and easy to use, yet provides sufficient accuracy and resolution in continuous scanning measurement to measure workpiece surfaces. A dial gauge includes a spindle provided to be movable reciprocatively in an axial direction through a main body case. The main body case includes a stem provided to protrude from a side face of the main body case. A ball bearing that bears the spindle is provided inside the stem. A workpiece and the dial gage are relatively moved while a contact point at the tip of the spindle is in contact with the surface of the workpiece, and continuous scanning measurement is performed to measure irregularities of the surface of the workpiece or the amount of runout of the rotating workpiece.

6 Claims, 7 Drawing Sheets

(56) References Cited

U.S. PATENT DOCUMENTS

| | | | | | |
|---|---|---|---|---|---|
| 5,505,003 | A * | 4/1996 | Evans | G01B 5/20 | |
| | | | | 33/501.7 | |
| 9,279,441 | B2 * | 3/2016 | Richter | G01B 5/012 | |
| 10,234,272 | B2 * | 3/2019 | Jensen | G01B 11/007 | |
| 10,717,164 | B1 * | 7/2020 | Navarro, Sr. | B23Q 17/2241 | |
| 11,105,605 | B2 * | 8/2021 | Wilkinson | G01B 3/56 | |
| 11,940,270 | B2 * | 3/2024 | Ruck | G01B 21/047 | |
| 12,196,544 | B2 * | 1/2025 | Terautchi | G01B 3/22 | |
| 2013/0238272 | A1 * | 9/2013 | Chen | G01B 3/22 | |
| | | | | 702/95 | |
| 2015/0285610 | A1 * | 10/2015 | Knäbel | G01B 5/24 | |
| | | | | 33/501.14 | |
| 2022/0341733 | A1 * | 10/2022 | Terautchi | G01B 3/22 | |
| 2023/0131792 | A1 * | 4/2023 | Bagdal | B23B 25/06 | |
| | | | | 451/5 | |
| 2024/0230304 | A9 * | 7/2024 | Kikuchi | G06F 3/017 | |
| 2024/0230305 | A9 * | 7/2024 | Kikuchi | G01B 3/22 | |
| 2025/0137770 | A1 * | 5/2025 | Onoe | G01B 3/22 | |

FOREIGN PATENT DOCUMENTS

| | | | | | |
|---|---|---|---|---|---|
| JP | 2008-309687 | A | | 12/2008 | |
| JP | 2016212012 | A | * | 12/2016 | |
| JP | 6474680 | B2 | * | 2/2019 | |
| JP | 2021071376 | A | * | 5/2021 | |
| JP | 2021143878 | A | * | 9/2021 | |
| WO | WO-2024053571 | A1 | * | 3/2024 | G01B 5/00 |
| WO | WO-2024053575 | A1 | * | 3/2024 | G01B 3/22 |

* cited by examiner

MEASURING DEVICE AND METHOD FOR MEASURING WORKPIECE USING THE MEASURING DEVICE

INCORPORATION BY REFERENCE

This application is based upon and claims the benefit of priority from JP patent application No. 2022-175835, filed on Nov. 1, 2022 (DAS code C495), the disclosure of which is incorporated herein by reference.

BACKGROUND OF THE PRESENT INVENTION

1. Field of the Present Invention

The present invention relates to a linear-moving-spindle small-sized measuring device and a method for measuring a workpiece using the measuring device.

2. Description of Related Art

Lever-type dial gauges (test indicators) are small-sized, portable, relatively inexpensive and simple measuring devices with high accuracy and resolution. Lever-type dial gauges excel in measuring micro-displacements, such as circular runout, total runout, flatness, and parallelism, and are used for precision inspections of products.

A lever-type dial gauge includes an axial contact point rotatably supported about an axis by a main body case, and magnifies a micro angular displacement of the contact point using the principle of leverage. This makes lever-type dial gauges high-precision, high-resolution measuring devices.

Patent literature 1: JP 2008-309687 A

SUMMARY OF THE PRESENT INVENTION

Although lever-type dial gauges (test indicators) are high-precision, high-resolution measuring devices, they have the disadvantage that their measuring range is inevitably limited to a very small area due to their measuring principle. The measuring range of a lever-type dial gauge (test indicator) is about 1 mm, and even if a longer contact point is used, the measuring range is limited to about 2 mm. When using a measuring device with a short (narrow) measuring range, an object to be measured is naturally limited to that range. In addition, when using a measuring device with a short (narrow) measuring range, strict adjustment is required to ensure that the irregularities and amount of runout of a workpiece do not exceed the measuring range when setting (initial alignment of) the workpiece and the measuring device. For example, when setting a measuring device (lever-type dial gauge), a user is required to adjust the relative position and posture of the measuring device and a workpiece in such a manner that the initial position is aligned in the middle of the measuring range as much as possible. Therefore, using a high-performance lever-type dial gauge with a very short measuring range requires time and effort in the preparation stage before measurement, which makes it difficult to improve measurement efficiency.

There is a demand for a measuring device that is inexpensive, easy to use, and yet provides sufficient accuracy and resolution in continuous scanning measurement to measure workpiece surfaces.

A measuring device according to an exemplary embodiment of the present invention includes:

- a spindle provided to be movable reciprocatively in an axial direction through a housing part, wherein
- the housing part includes a bearing part configured to guide the spindle to move linearly, and
- the bearing part is a ball bearing.

In an exemplary embodiment of the present invention, it is preferable that the measuring device further includes:

- a bearing cylinder part provided to protrude from a side face of the housing part and including a cylindrical hole through which the spindle is inserted, wherein
- the ball bearing is provided between an inner surface of the bearing cylinder part and an outer surface of the spindle.

In an exemplary embodiment of the present invention, it is preferable that the measuring device further includes:

- a lever-type contact point to be attachable to a tip of the spindle and including a contact point at a tip of a lever part extending in a direction intersecting an axis of the spindle.

A measurement method according to an exemplary embodiment of the present invention is a measuring method for measuring a workpiece using the measuring device, the method includes:

- relatively moving the workpiece and the measuring device while a contact point at a tip of the spindle is in contact with a surface of the workpiece, and
- performing continuous scanning measurement to measure irregularities of the surface of the workpiece or an amount of runout of the rotating workpiece.

A measurement method according to an exemplary embodiment of the present invention is a measuring method for measuring a workpiece using the measuring device, the method includes:

- relatively moving the workpiece and the measuring device while the contact point of the lever-type contact point is in contact with a surface of the workpiece, and
- performing continuous scanning measurement to measure irregularities of the surface of the workpiece or an amount of runout of the rotating workpiece.

DETAILED DESCRIPTION

Figure 1:
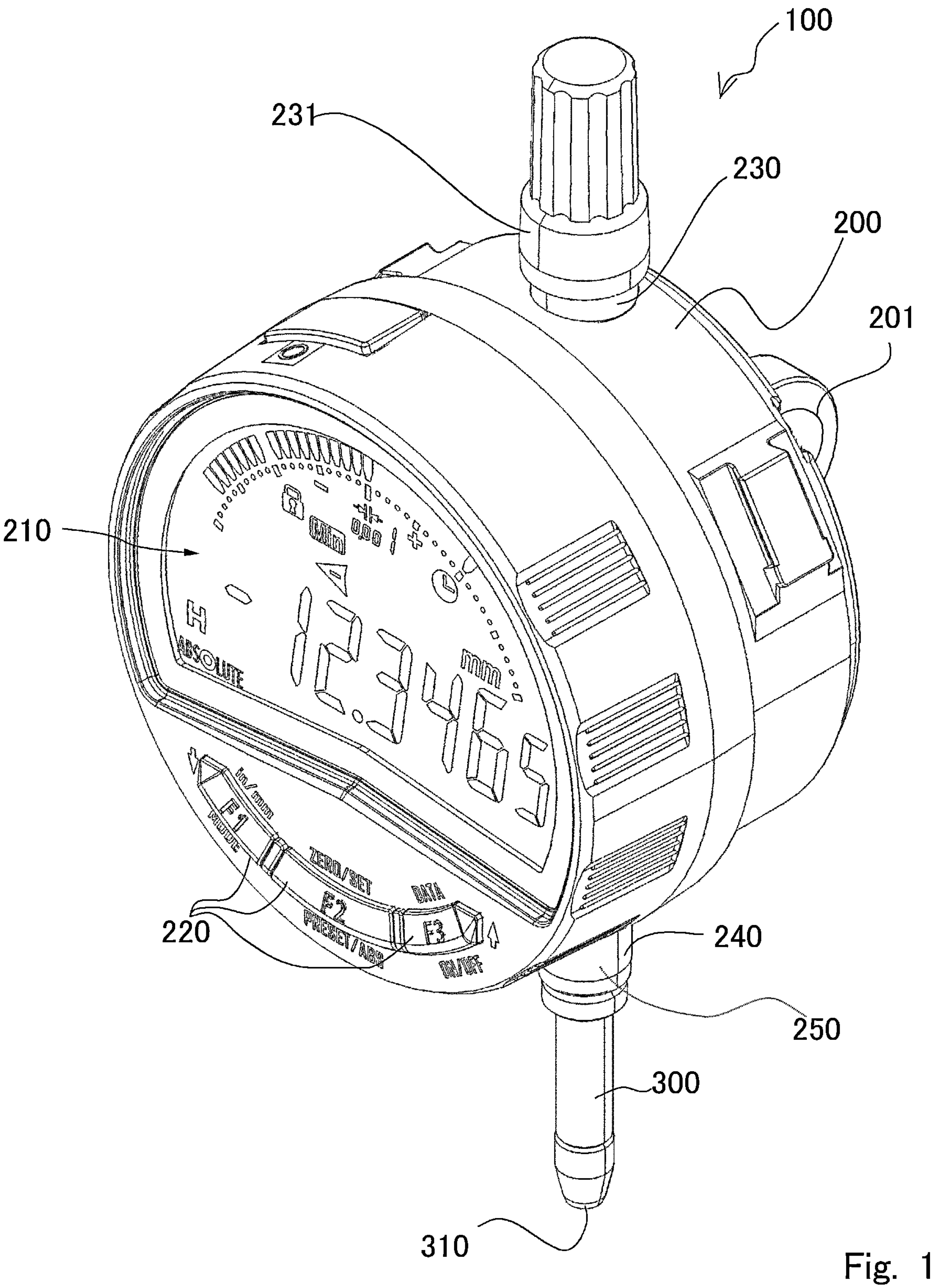
FIG. 1 is an external appearance diagram of a dial gauge.

Embodiments of the present invention are illustrated and described with reference to the reference signs assigned to the elements in the drawings.

First Exemplary Embodiment

A first exemplary embodiment of the present invention is described below.

In the present exemplary embodiment, a digital-display dial gauge 100 is used as an example.

The digital-display dial gauge 100 is also referred to as a digital dial gauge, indicator, digital indicator, test indicator, linear gauge, and the like.

Although the digital-display dial gauge 100 is used as an example in the present exemplary embodiment, the present invention is applicable to an analog-display dial gauge (analog dial gauge) 100 that displays the displacement of a spindle 300 magnified by a gear wheel train with a pointer and dial.

FIG. 1 is an external appearance diagram of the dial gauge 100.

The dial gauge 100 includes a main body case (housing part) 200, a spindle (linear movable member) 300 provided on the main body case 200 to be movable forward and backward in the axial direction, a biasing means (for example, a spring) (not shown) that biases the spindle 300 toward the tip, and a displacement detector (encoder) (not shown) that detects displacement (position) of the spindle 300.

The main body case 200 is a cylindrical case body as a whole. The biasing means and the displacement detector are provided inside the main body case 200, and other electric circuits (electronic units) necessary for processing and display control are accommodated in the main body case 200. A digital display part 210 and various buttons 220 are disposed on the front lid body of the main body case 200. Various modes can be selected by operating the buttons.

For example, in a measurement mode, a numeric value on the digital display part 210 is a measurement value itself. The measurement value is expressed, for example, as the difference from the base point (origin) set by calibration. In a hold mode, a measurement value (displayed value) is fixed and displayed. For example, the maximum value (Max) or the minimum value (Min) can be displayed on hold. Alternatively, the middle value between the maximum and minimum values (here, referred to as the intermediate value) may be displayed on hold (intermediate-value hold display). Furthermore, the runout range (maximum value—minimum value, Tir) in runout measurement may be displayed on hold.

The spindle 300 includes a contact point (contact sphere) 310 at its tip and is provided to be movable in the axial direction in such a manner as to pass through the main body case 200. (Although the spindle of a dial gauge does not rotate, the name "spindle" is well known and thus is used in this specification. The term "spindle" may be paraphrased by rod.)

The main body case 200 includes a through hole (upper through hole) on its upper side face, and a cylindrical upper bush (upper bearing cylinder part) 230 is attached to the upper through hole. In addition, a cap 231 is provided to close the upper bush 230. Here, the upper bush 230 is what is called a plain bearing.

The main body case 200 further includes a through hole (lower through hole) on its lower side face, and a cylindrical lower stem (lower bearing cylinder part) 240 is attached to the lower through hole.

Here, the bearing between the lower stem 240 and the spindle 300 is a ball bearing (linear ball bearing) 250. That is, a retainer 251 and a ball 252 held in the retainer 251 are disposed between the lower stem 240 and the spindle 300.

Figure 2:
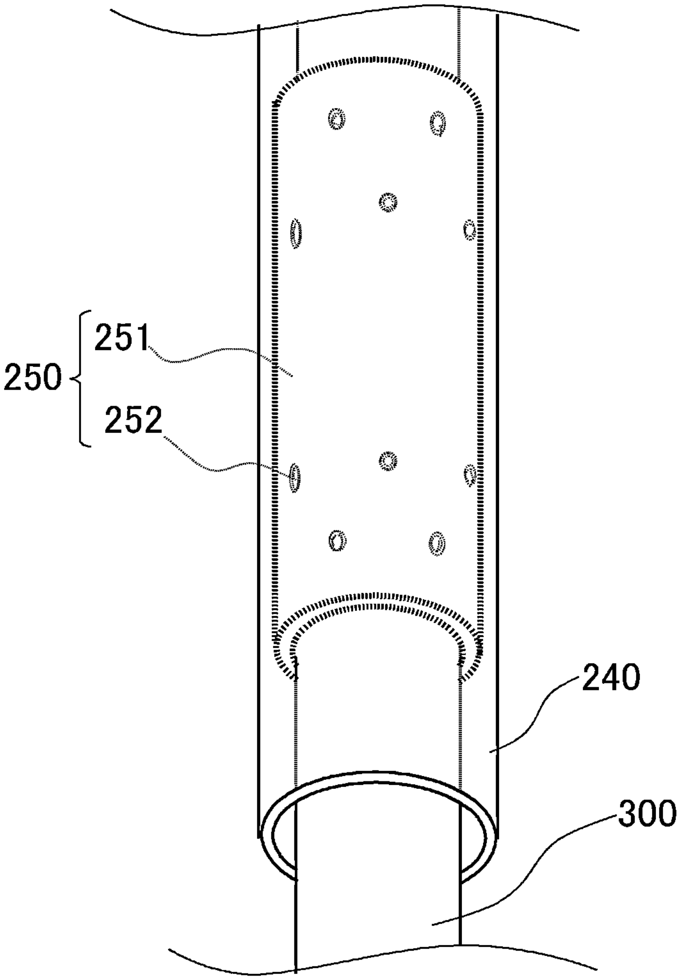
FIG. 2 is a diagram showing an example of a ball bearing.

FIG. 2 is a diagram showing an example of the ball bearing (linear ball bearing) 250. The ball bearing 250 allows the spindle 300 to be borne and guided with absolutely no gap (rattling) and extremely low friction.

Figure 3:
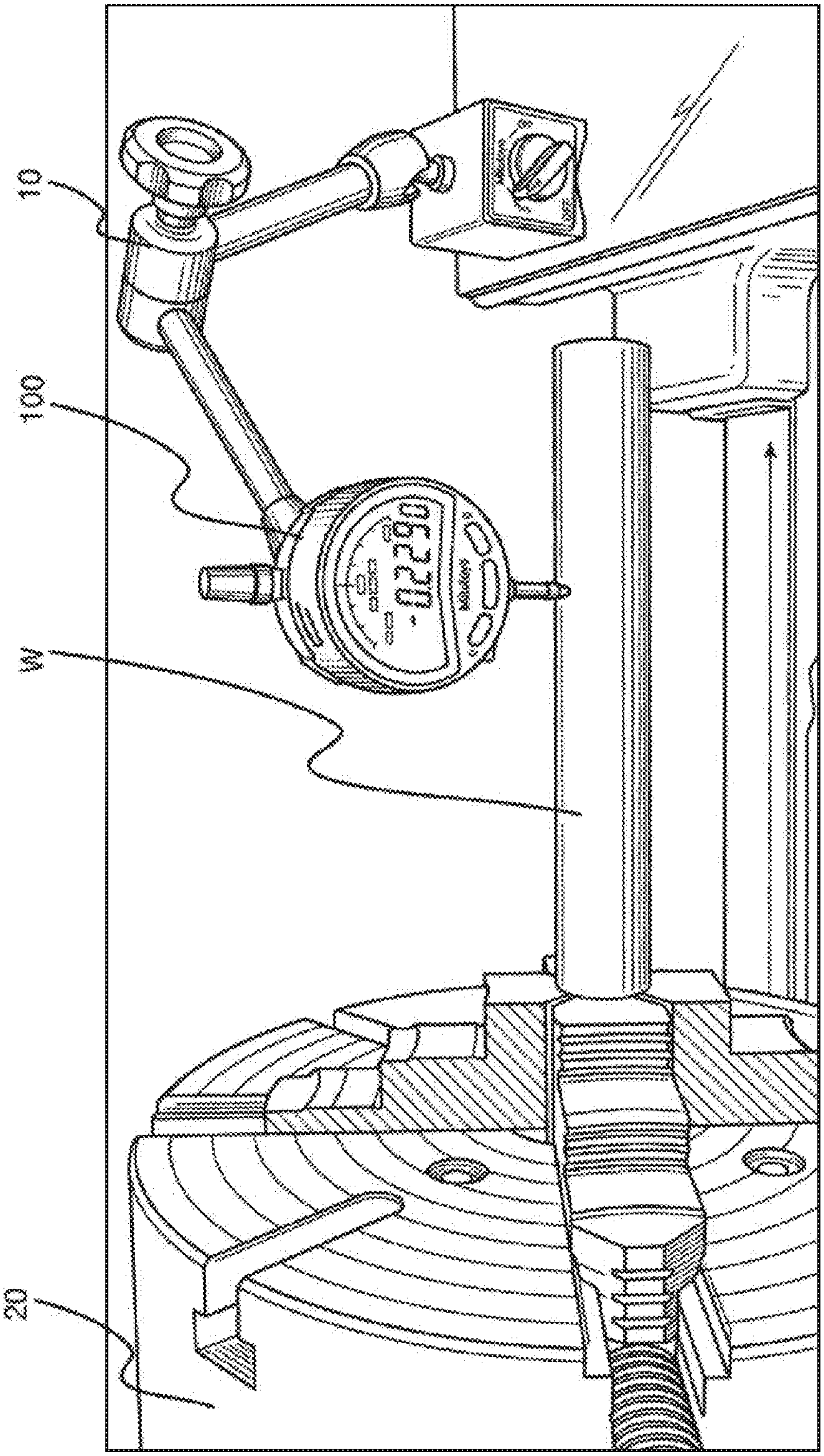
FIG. 3 is a view showing an example of the use in the present exemplary embodiment.

FIG. 3 is a view showing an example of the use in the present exemplary embodiment.

While a hollow cylindrical (or cylindrical) workpiece W is rotated on a lathe 20, the runout (circular runout or total runout) of the workpiece W is measured. The dial gauge 100 is attached to a stand 10, and the workpiece W is attached to the chuck of the lathe 20. The dial gauge 100 is attached to the stand 10 by a mounting part 201 on the back face of the main body case 200 in FIG. 3, but the dial gauge 100 may be attached to the stand 10 by holding the lower stem 240 (outer surface of the stem 240).

The spindle 300 (extension of the spindle 300) of the dial gauge 100 should be perpendicular to the rotation axis (extension of the rotation axis) of the lathe 20. If the rotation axis of the lathe 20 is horizontal, the dial gauge 100 is attached to the stand 10 in such a manner that the spindle 300 of the dial gauge 100 is parallel to the vertical line. Then, the spindle 300 is made to approach the workpiece W from directly above along the vertical line.

In this state, the hollow cylindrical (or cylinder) workpiece W is rotated.

While the contact point 310 of the spindle 300 is in contact with the surface of the workpiece W, the spindle 300 follows the surface of the workpiece W and measures the runout (circular runout or total runout) of the workpiece W. Even if the amount of runout of the workpiece W rotating on the lathe 20 is only a several millimeters, the amount of runout is within the measuring range of the dial gauge 100. Therefore, in setting the measuring device (dial gauge) 100, the user does not need to be concerned about the initial position to be the middle of the measuring range. In addition, since the ball bearing 250 in the lower stem 240 provides the sliding guide of the spindle 300 with absolutely no gap and extremely low friction, the spindle 300 can smoothly follow even a micro displacement and detect the amount of runout of the workpiece W with high resolution.

Second Exemplary Embodiment

A dial gauge in a second exemplary embodiment is the dial gauge 100 in the first exemplary embodiment with a lever-type contact point attached.

A lever-type contact point 400 is an auxiliary fixture jig for the dial gauge 100.

The lever-type contact point 400 includes a lever part 420 extending in a direction intersecting the axis of the spindle 300 and a contact point 430 at the tip of the lever part 420.

Figure 4:
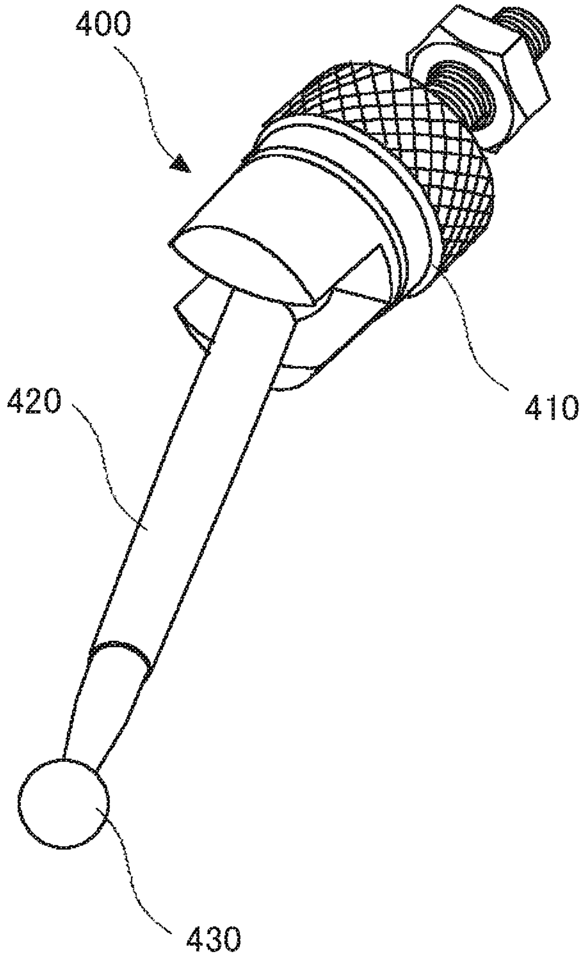
FIG. 4 is an external appearance diagram of a lever-type contact point.

FIG. 4 is an external appearance diagram of the lever-type contact point 400. The lever-type contact point 400 includes a base 410 that can be attached to or detached from the tip of the spindle 300 by a screw or the like, and the lever part 420 that is a shaft supported by the base 410 to freely rotate and be fixed at a desired angle. The contact point (contact sphere) 430 is provided at the tip of the lever part 420.

The angle of the lever part 420 can be freely adjusted in a direction intersecting the spindle 300. Therefore, even in cases in which the spindle 300 cannot be brought into contact perpendicularly with a point to be measured (for example, the inner surface of a hole) due to the shape or arrangement of a workpiece W, the point to be measured can be measured by inserting the lever-type contact point 400. In addition, the lever part 420 can be replaced with, for example, a lever part 420 having a different length to measure a measurement point away from the spindle 300.

In the present invention, since the spindle 300 of the dial gage 100 is borne by the ball bearing 50 and the sliding guide of the spindle 300 has absolutely no gap and extremely low friction, the spindle 300 can smoothly follow micro displacements and detect micro irregularities and the amount of runout of the workpiece W with high resolution.

This effect is maintained even when a lever-type contact point is attached to the tip of the spindle 300, and is effective even when the lever-type contact point is used to measure a measurement point away from the axis of the spindle. In other words, by using a lever-type contact point, high resolution and accuracy can be achieved even in the case of continuous scanning measurement to measure irregularities on the surface of a workpiece or the amount of runout of a rotating workpiece at a measurement point away from the axis of the spindle. A linear-moving-spindle dial gauge (indicator) has the advantage of having a longer stroke than a lever-type dial gauge. The measuring range of the dial gauge (indicator) is, for example, 5 mm to 10 mm, and some are even longer. Therefore, with the measuring device (dial gauge) according to the exemplary embodiments in the present invention, it is possible to measure surface properties in areas that are difficult to measure, such as an inner surface, as with a lever-type dial gauge, while taking advantage of a long stroke, which is an advantage of the linear-moving-spindle dial gauge (indicator).

Conventionally, a dial gauge is designed to measure the surface of a workpiece by bringing the contact point at the tip of the spindle into contact with the workpiece on the axis of the spindle using up/down movement of the spindle. If the contact point is brought into contact with the workpiece on the axis of the spindle, the resolution and accuracy of the dial gauge are equivalent to those of a lever-type dial gauge, and the resolution and accuracy of the dial gauge are 0. 01 mm or 0. 001 mm even for continuous surface scanning measurement. The lever-type contact point is an auxiliary jig for the dial gauge, but a conventional dial gauge with a lever-type contact point is mainly designed for single up/down movement of the spindle for each measurement, such as comparative dimensional measurement between a master (or gauge block) and a workpiece W. The lever-type contact point is not intended for continuous scanning measurement to measure the surface of the workpiece W with the lever-type contact point attached.

However, in recent years, due to various demands for parts inspection, such as higher requirements for parts machining accuracy, an increase in the number of parts inspection items, insufficient manpower, and the need to improve measurement efficiency, a linear-moving dial gauge with a lever-type contact point is used as an alternative to a long-stroke lever-type dial gauge in some cases. Some users own a linear-moving dial gauge but do not own a lever-type dial gauge, and users need to have several models of lever-type dial gauges for each length of contact point because of their principle of leverage, which is rather costly and burdensome for storage. However, when the amount of runout of a workpiece surface or a rotating workpiece is measured in continuous scanning measurement by a conventional dial gauge with a lever-type contact point, the resolution and accuracy are not as good as those of a lever dial gauge.

The inventors investigated the cause of the problem by conducting contrast tests between many different types of measuring devices and dial gauges and by replacing the parts of the different types of measuring devices to compare the resolution and accuracy.

Then, the inventors noticed that when a lever-type contact point is attached to the tip of the spindle of a dial gauge, the contact between the contact point and a workpiece was shifted from the center axis of the spindle, which caused a lateral load on the plain bearing and increased the resistance of spindle operation, and this could adversely affect accuracy. In other words, in a conventional dial gauge, the bearings at the upper bush and the lower stem of the spindle are plain bearings, but in the case of plain bearings, friction acts between the spindle and the stem (or bush) to some extent. In addition, since there is a gap in plain bearings in principle and this gap is several microns (μm) to several tens of microns (μm), a slight inclination is caused when the spindle is pushed up or down in the axial forward/backward movement. Especially when the contact between the contact point and the workpiece is away from the axis of the spindle, as is the case with a lever-type contact point, the direction of the force applied from the workpiece W (workpiece surface) to the contact point 430 of the lever-type contact point 400 does not match the axial direction of the spindle 300 but is slightly shifted. Therefore, it is considered that the influence of the gap (rattling) between the spindle 300 and the bearing (stem or bush) is more noticeable when the lever-type contact point 400 is used than when the force is applied along the axis of the spindle 300 in the normal measuring operation of a dial gauge. For this reason, the inventors have developed the dial gage 100 that can measure micro displacements with long stroke, high-resolution, and high-accuracy in continuous scanning measurement even when a measurement needs to use a lever-type contact point, by providing the ball bearing 250 (rolling bearing) for one of the upper bush 230 and the lower stem 240 of the dial gauge 100 (in this case, the lower stem 240).

Example of Experiment

Figure 5:
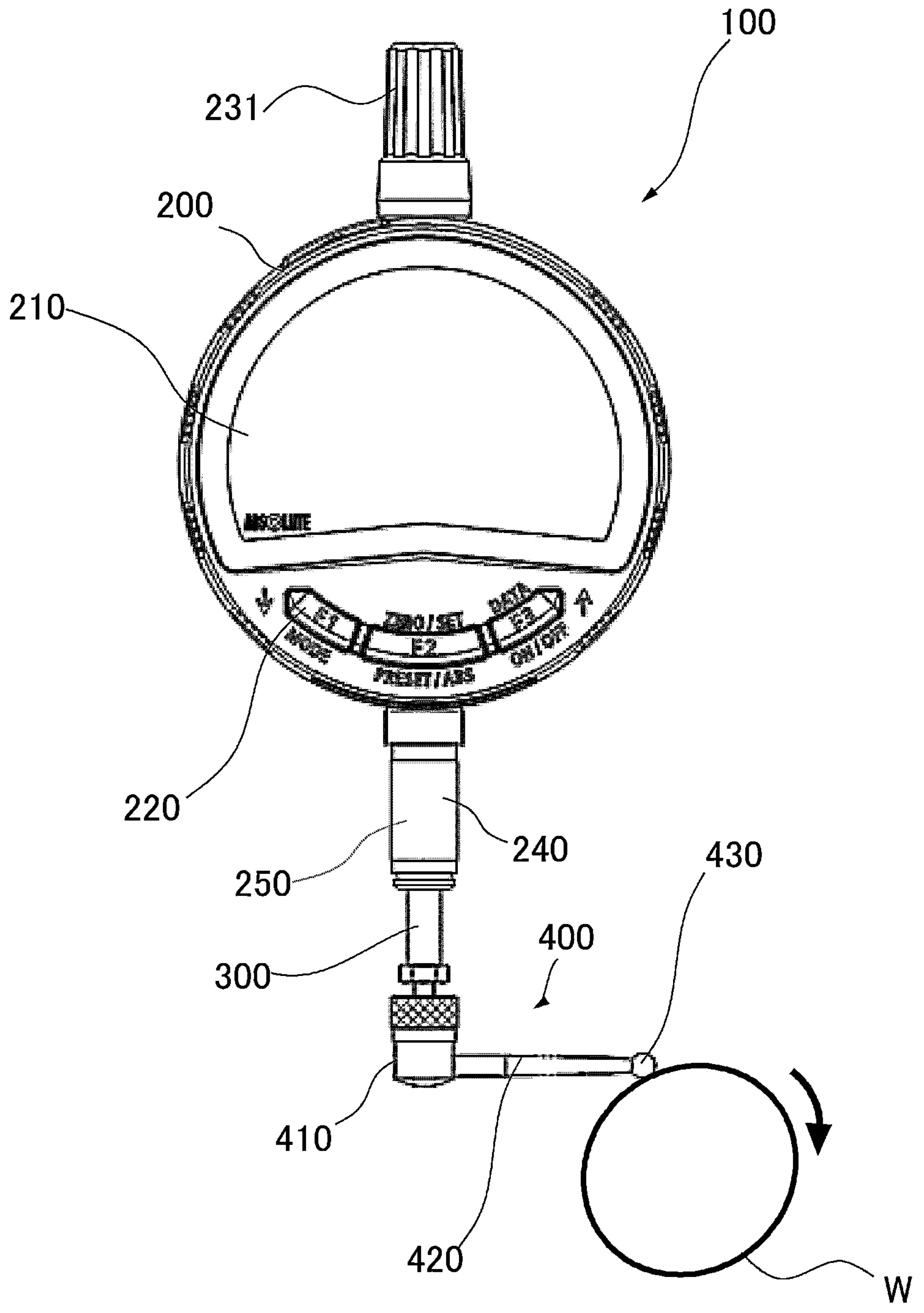
FIG. 5 is a diagram for explaining the configuration used in an experiment.
Figure 6:
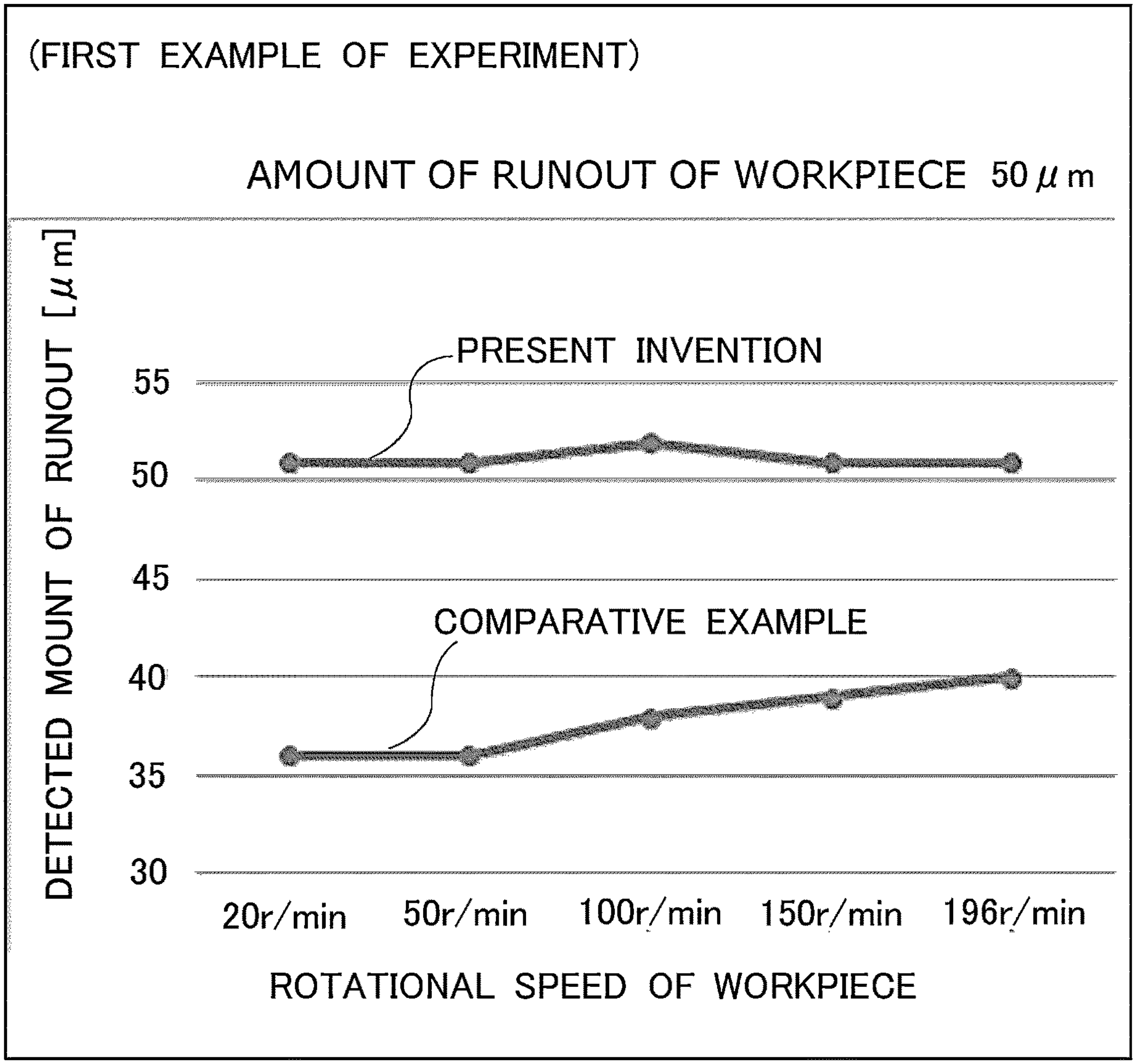
FIG. 6 is a graph showing a first example of experiment.
Figure 7:
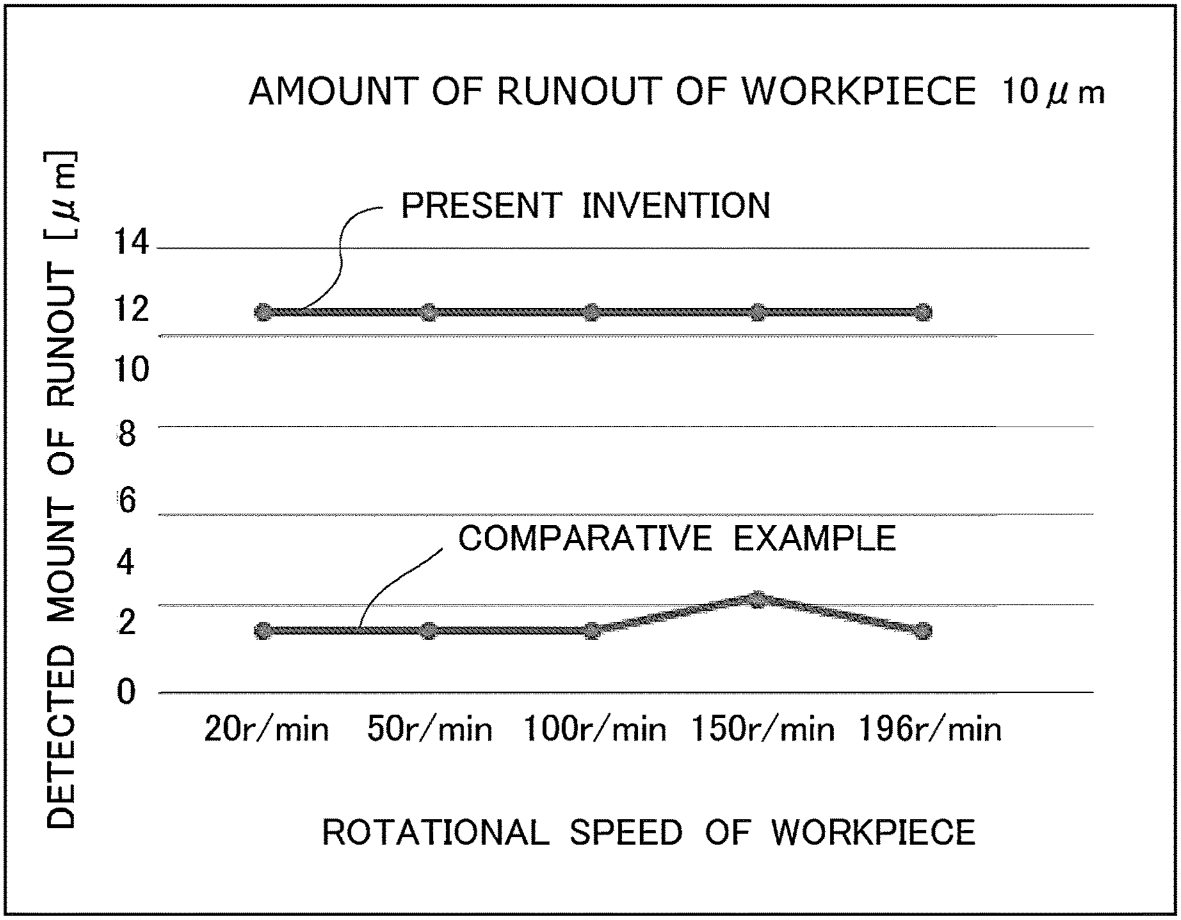
FIG. 7 is a graph showing a second example of experiment.

FIGS. 5, 6, and 7 are referred to for an example of experiment.

FIG. 5 is a graph for explaining the configuration used in the experiment.

For the experiment, the dial gauge 100 described in the second exemplary embodiment was prepared as the configuration of the present invention. That is, the dial gauge 100 included the ball bearing 250 disposed in the lower stem 240 and the lever-type contact point 400 attached to the tip of the spindle 300. Here, the angle of the lever part 420 of the lever-type contact point 400 was fixed at 90°.

As a comparison (comparative example), the lever-type contact point 400 was attached to a conventional dial gauge. In other words, the lower stem bore the spindle 300 with a plain bearing.

A cylindrical workpiece W was rotated on the lathe 20 and the amount of runout of the workpiece W was measured in continuous scanning measurement.

The amount of runout of the workpiece W was known in advance. In the first example of experiment shown in FIG. 6, the amount of runout of the workpiece W was 50 μm. In the second example of experiment shown in FIG. 7, the amount of runout of the workpiece W was 10 μm. The amount of runout of the workpiece W was measured with each measuring device while changing the rotational speed of the workpiece W from 20 rpm to 196 rpm.

Note that, the outer surface of a hollow cylindrical (cylindrical) workpiece was measured in the experiments, but the experimental results are the same if the inner surface is measured.

With the conventional dial gauge (comparative example), there was a measurement error of about 10 μm in the first example of experiment, in which the amount of runout of the workpiece W was 50 μm, and in the second example of experiment, in which the amount of runout of the workpiece W was 10 μm. This cannot be said that the amount of runout of the workpiece W was accurately measured.

On the other hand, with the configuration of the present invention, the measurement error was within 2 μm in both the first (FIG. 6) and second (FIG. 7) example of experiments, and this did not change whether the workpiece W was rotating fast or slow.

In other words, according to the configuration of the present invention, it is possible to measure irregularities of the surface of a workpiece W and the amount of runout of a rotating workpiece W with high accuracy and high resolution in continuous scanning measurement by using the dial gauge with the lever-type contact point attached to the tip of the spindle. In addition, the linear-moving-spindle dial gauge 100 allows a longer stroke of the spindle 300, which results in a wider measurement range.

Since the measuring device in the present invention basically follows the configuration of the dial gauge 100, the measuring device is much less expensive than other measuring devices with long strokes, high accuracy, and high resolution, although there is an increase in cost for the ball bearing 250.

In addition, since the dial gauge 100 includes the digital display part 210 (or an analog display part constituted by a pointer and dial) on the front lid body, the dial gauge 100 can be used alone for measurement if a user carries only it.

For example, the measuring device in the present invention is easier to handle than other measuring devices that require a control unit and a measurement value detection counter in addition to the main body of the measuring device to be used together. Furthermore, the measuring device in the present invention has a long stroke, high accuracy, and high resolution, and can measure micro displacements such as surface irregularities and runout of rotation of a workpiece W in continuous scanning measurement.

The present invention is not limited to the above exemplary embodiments, and can be appropriately modified without departing from the gist.

In the above exemplary embodiments, a ball bearing is provided inside the lower stem (lower bearing cylinder part). However, a ball bearing may be provided inside the upper bush (upper bearing cylinder part). Alternatively, ball bearings may be provided in both the lower stem (lower bearing cylinder part) and the upper bush (upper bearing cylinder part).

The terms "upper" and "lower" in the description of embodiments are used for clarity of explanation and are not intended to limit the scope of rights. The use of the names "lower stem" and "upper bush" in this specification is based on the customary names for dial gauge parts, and a bearing cylinder part in claims includes both a lower bearing cylinder part as a lower stem and an upper bearing cylinder part as an upper bush.

100 Dial gauge
200 Main body case
210 Display part
220 Button
230 Upper bush
231 Cap
240 Lower stem
250 Ball bearing
251 Retainer
252 Ball
300 Spindle
310 Contact point
400 Lever-type contact points
410 Base
420 Lever part
430 Contact point
20 Lathe
10 Stand
W Workpiece

The invention claimed is:

1. A measuring device comprising:
a spindle provided to be movable reciprocatively in an axial direction through a housing part, wherein
the housing part includes a bearing part configured to guide the spindle to move linearly, and
the bearing part is a ball bearing,
further comprising:
a lever-type contact point to be attachable to a tip of the spindle and including a contact point at a tip of a lever part extending in a direction intersecting an axis of the spindle,
wherein the lever-type contact point includes a base that can be attached to, or detached from, the tip of the spindle, and
the lever part is a shaft supported by the base to freely rotate and be fixed at a desired angle.

2. The measuring device according to claim 1, further comprising:
a bearing cylinder part provided to protrude from a side face of the housing part and including a cylindrical hole through which the spindle is inserted, wherein
the bearing cylinder part includes one bearing cylinder part that supports the tip end side of the spindle, and another bearing cylinder part that supports the base end side of the spindle, wherein
the ball bearing is provided between an inner surface of the one bearing cylinder part and an outer surface of the spindle.

3. The measuring device according to claim 1, further comprising:
a bearing cylinder part provided to protrude from a side face of the housing part and including a cylindrical hole through which the spindle is inserted, wherein
the bearing cylinder part includes one bearing cylinder part that supports the tip end side of the spindle, and another bearing cylinder part that supports the base end side of the spindle, wherein
the ball bearing is provided between an inner surface of the one bearing cylinder part and an outer surface of the spindle, and also between an inner surface of the another bearing cylinder part and the outer surface of the spindle.

4. A method for measuring a workpiece using a measuring device including a spindle provided to be movable reciprocatively in an axial direction through a housing part and a lever-type contact point to be attachable to a tip of the spindle and including a contact point at a tip of a lever part extending in a direction intersecting an axis of the spindle, wherein the housing part includes a bearing part configured to guide the spindle to move linearly, and the bearing part is a ball bearing, and the lever-type contact point includes a base that is attachable to or detachable from the tip of the spindle, and the lever part is a shaft supported by the base to freely rotate and be fixed at a desired angle, the method comprising:
fixing the angle of the lever part at a desired angle;
relatively moving the workpiece and the measuring device while the contact point of the lever-type contact point is in contact with a surface of the workpiece; and performing continuous scanning measurement to measure irregularities of the surface of the workpiece or an amount of runout of the workpiece.

5. The measuring method according to claim 4, where the measuring device further includes a bearing cylinder part provided to protrude from a side face of the housing part and including a cylindrical hole through which the spindle is inserted, wherein the bearing cylinder part includes one bearing cylinder part that supports the tip end side of the spindle, and another bearing cylinder part that supports the base end side of the spindle, and wherein the ball bearing is provided between an inner surface of the one bearing cylinder part and an outer surface of the spindle.

6. The measuring method according to claim 4, where the measuring device further includes a bearing cylinder part provided to protrude from a side face of the housing part and including a cylindrical hole through which the spindle is inserted, wherein the bearing cylinder part includes one bearing cylinder part that supports the tip end side of the spindle, and another bearing cylinder part that supports the base end side of the spindle, and wherein the ball bearing is provided between an inner surface of the one bearing cylinder part and an outer surface of the spindle, and also between an inner surface of the another bearing cylinder part and an outer surface of the spindle.

* * * * *